(12) United States Patent
Marsan et al.

(10) Patent No.: US 7,382,754 B2
(45) Date of Patent: Jun. 3, 2008

(54) METHOD AND APPARATUS SHARING A SLOT DESCRIPTOR BLOCK BETWEEN MULTIPLE USERS

(75) Inventors: Mark J. Marsan, Elmhurst, IL (US); Michael N. Kloos, Belvidere, IL (US)

(73) Assignee: Motorola, Inc., Schaumburg, IL (US)

( * ) Notice: Subject to any disclaimer, the term of this patent is extended or adjusted under 35 U.S.C. 154(b) by 984 days.

(21) Appl. No.: 10/387,379

(22) Filed: Mar. 14, 2003

(65) Prior Publication Data
US 2004/0179501 A1 Sep. 16, 2004

(51) Int. Cl.
*H04J 3/00* (2006.01)
(52) U.S. Cl. .................. 370/336; 370/337; 370/347; 370/470
(58) Field of Classification Search ........ 370/336–337, 370/328–329, 347, 470, 345, 442, 321
See application file for complete search history.

(56) References Cited

U.S. PATENT DOCUMENTS

| | | | |
|---|---|---|---|
| 5,818,823 A * | 10/1998 | Nakanishi | 370/322 |
| 6,411,613 B1 | 6/2002 | Seymour et al. | |
| 6,614,797 B1 * | 9/2003 | Hippelainen | 370/410 |
| 6,741,579 B1 * | 5/2004 | Choi et al. | 370/337 |
| 2004/0125786 A1 * | 7/2004 | Fuchs | 370/350 |
| 2004/0246891 A1 * | 12/2004 | Kay et al. | 370/215 |

FOREIGN PATENT DOCUMENTS

| | | |
|---|---|---|
| JP | 06-273132 A | 9/1994 |
| JP | 07-110863 A | 4/1995 |
| WO | 9913666 | 3/1999 |

\* cited by examiner

*Primary Examiner*—George Eng
*Assistant Examiner*—Marcos L. Torres

(57) ABSTRACT

An Integrated Digital Enhanced Network system (1) includes a base radio (104) interconnected to a plurality of transcoders (4) located at central offices (2). The base radio (104) time division multiplexes voice packets from the plurality of transcoders (4) into a time division multiplexed signal frame (20). Each signal frame (20) includes a plurality of sequential frames (204). Each sequential frame (204) includes a predetermined number of slots (202) based upon a channel interleave. Each of the slots (202) includes a slot descriptor block (2024), and a plurality of subslots (e.g., 2026, 2028). The slot descriptor block (2024) alternatively contains overhead information for the plurality of subslots (e.g., 2026, 2028). The subscriber device (30) demultiplexes each sequential frame (204) and receives a specific slot (202) and a specific subslot of the specific slot based upon an assigned slot offset. The subscriber device (30) executes a handover process (600) for determining a timing for jumping to a time division signal frame (21) generated by a new base radio.

8 Claims, 3 Drawing Sheets

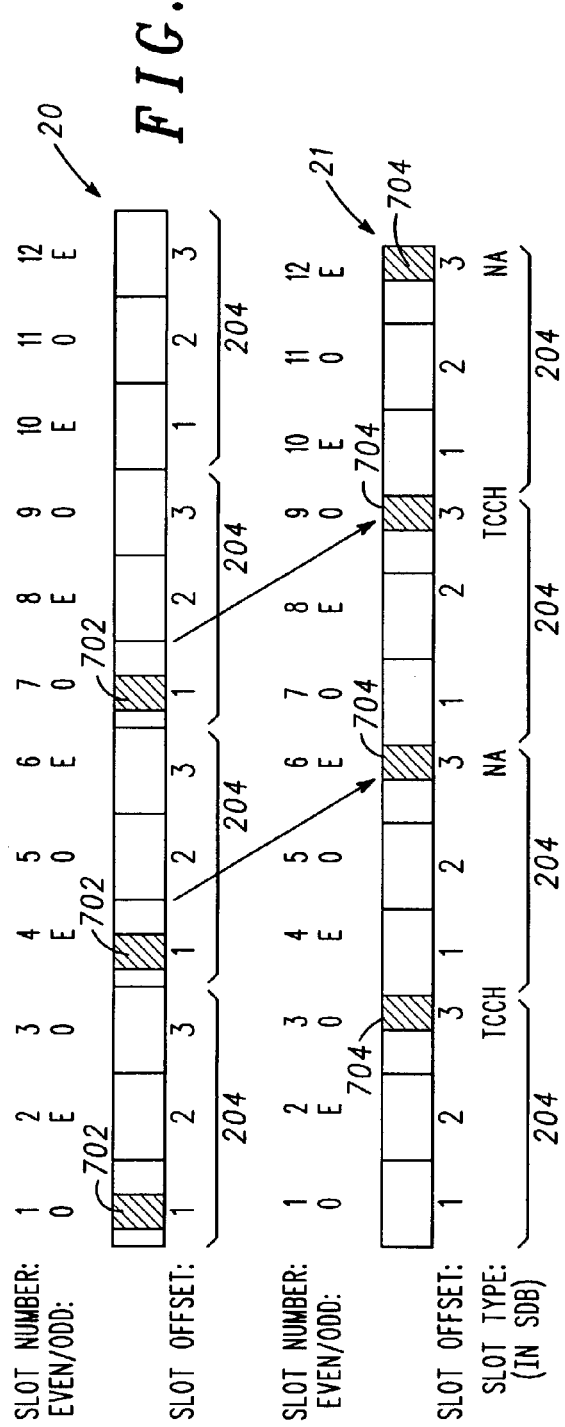

METHOD AND APPARATUS SHARING A SLOT DESCRIPTOR BLOCK BETWEEN MULTIPLE USERS

FIELD OF THE INVENTION

The present invention relates to reception and transmission of signals and, more particularly, to an apparatus and method for reception and transmission of multiplexed signals within an Integrated Digital Enhanced Network.

BACKGROUND OF THE INVENTION

Enhanced vocoders such as, for example, the AMBE vocoder have recently been introduced within Integrated Digital Enhanced Network (iDEN) systems for interconnect services. The bandwidth requirement of the AMBE vocoder is roughly half of the bandwidth requirement of earlier vocoders such as the VSELP transcoder. The lowered bandwidth requirement of these enhanced vocoders permits employment of a 6:1 interleave channel rather than the current 3:1 interleave channel, thereby doubling the channel efficiency and realizing RF capacity savings. However, employment of the 6:1 interleave channel provides higher audio delay that results in lower perceived audio quality than that provided by the 3:1 interleave channel.

BRIEF DESCRIPTION OF THE DRAWINGS

The accompanying figures, where like reference numerals refer to identical or functionally similar elements and which together with the detailed description below are incorporated in and form part of the specification, serve to further illustrate various embodiments and to explain various principles and advantages all in accordance with the present invention.

FIG. 7 is an exemplary illustration of the handover process being performed.

FIG. 8 illustrates a table showing all the timings for a handover with respect to the exemplary slot.

DETAILED DESCRIPTION OF THE PREFERRED EXEMPLARY EMBODIMENTS

In overview form the present disclosure concerns base radios that transmit signal frames and subscriber devices for receiving the signal frames. The present disclosure further concerns a methodology for permitting subscriber devices to make a handover from one base radio to another base radio. Note that subscriber device or unit may be used interchangeably herein with wireless device or unit and each of these terms denotes a device ordinarily associated with a user and typically a wireless device that may be used with a public network in accordance with a service agreement or within a private network.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in integrated circuits (ICs) of a digital signal processor such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the preferred embodiments.

As further discussed below various inventive principles and combinations thereof are advantageously employed to generate time division multiplexed signal frames composed of a plurality of signals associated with a plurality of subscriber device users, respectively, and in which groups of the plurality of signals share a slot descriptor block containing overhead information, thus permitting further efficient use of RF bandwidth.

Figure 1:
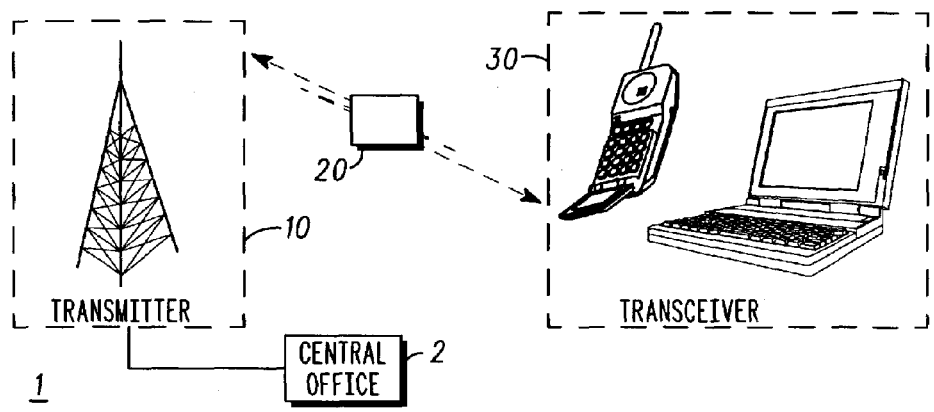
FIG. 1 depicts, in a simplified and representative form, an exemplary Integrated Digital Enhanced Network (iDEN) system in which the present invention is implemented.

Referring now to FIG. 1, the method and apparatus of the present invention are implemented within an Integrated Digital Enhanced Network (iDEN) system (hereafter "iDEN system") depicted generally by 1. The iDEN system 1 generally includes a central office 2, a base site (or base station) 10, a time division multiplexed signal frame (signal frame) 20 generated within and transmitted by the base site 10, and at least one subscriber device 30 for receiving this signal frame 20. Each of the elements of the iDEN system 1 will be discussed more fully below.

Figure 2:
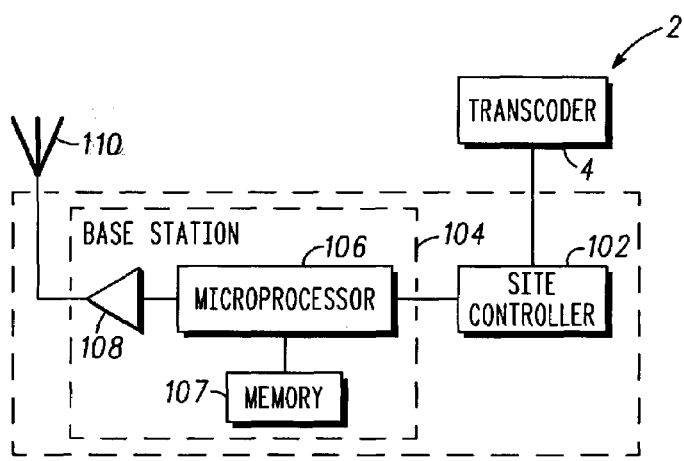
FIG. 2 illustrates a block diagram of the base radio and the central office of FIG. 1.

Referring to FIG. 2, the central office 2 includes, among other components, a transcoder (or vocoder) 4. The transcoder 4 is for encoding analog traffic, compressing the encoded analog traffic and generating resultant voice packets. The transcoder 4 preferably includes an AMBE vocoder that encodes approximately 45 ms of voice waveform into a voice packet. Other vocoders may be used. However, as will be discussed more fully below, the bandwidth or bit rate requirement provided by the transcoder 4 will limit the channel interleave of the signal frame 20. The other components and function of the central office 2 are known and appreciated in the art. It should be noted that numerous base sites will be coupled to the central office 2. Only one base site 10 has been shown for ease of illustration.

The base site 10 includes a site controller 102 and a base radio (or base transmitter) 104. The site controller 102 routes voice packets from one or more transcoders, such as the transcoder 4, to a correct base radio based upon a known routing algorithm. The base radio 104 performs forward error correction on each voice packet and subsequently time division multiplexes them into a signal frame 20 (shown in FIG. 3) for transmission over a common carrier such as, for example, a carrier frequency. More specifically, the base radio 104 will separate the plurality of voice packets (or generally signals) into a predetermined number of groups so that each of the predetermined number of groups includes a predetermined number of the plurality of signals. Each of the predetermined number of groups is stored within a slot of time (slot). Accordingly, the terms group and slot will be used interchangeably. The base radio 104 assigns an offset integer value to each slot and a predetermined channel interleave to the plurality of slots for dividing the predetermined number of slots into sequential frames. The channel interleave is predetermined in accordance with the bandwidth requirement of the transcoder 4. The base radio 104 will generate a slot descriptor block in each slot that will contain overhead information for the predetermined number of signals in the slot and store the slot descriptor block in its respective slot. As will be discussed more fully below, the slot descriptor block alternately contains the overhead information for the predetermined number of the plurality of signals in the slot, thereby permitting the plurality of signals to share the slot descriptor block. The base radio 104 will associate a slot number (see FIG. 7) with each slot for indexing the plurality of slots. Finally, the base radio 104 will modulate the signal frame and transmit it over the common carrier.

The base radio 104 includes a microprocessor or digital signal processing chip 106 for controlling the base radio 104, a power amplifier 108 for amplifying the signal power of the modulated signal frame and a base radio antenna 110 for transmitting the modulated signal frame. Returning to the microprocessor 106, the microprocessor 106 will control the base radio 104 in accordance with routines stored in memory (not shown). The routines will contain the instructions for performing the multiplexing, encoding and slot descriptor block tasks described above.

It should be noted that the base site 10 will include a plurality of base radios. Only one base radio 104 is shown in FIG. 2 for ease of illustration.

Figure 3:
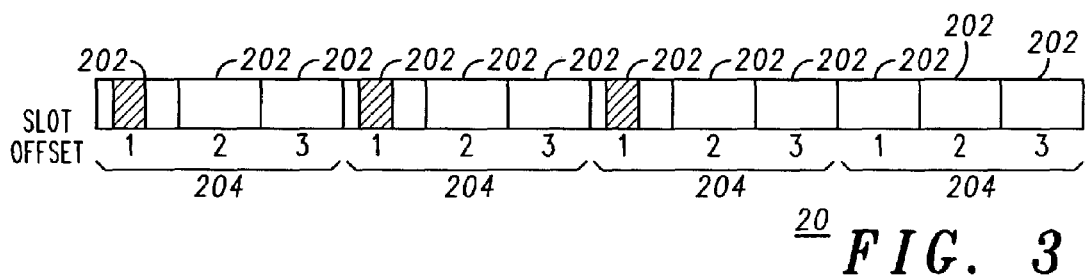
FIG. 3 illustrates an exemplary time division multiplexed signal frame generated by the base radio.

Referring to FIG. 3, the signal frame 20 generated by the base radio 104 will be discussed more fully. As mentioned earlier, the signal frame 20 includes a plurality of slots 202 having a predetermined channel interleave assigned thereto for dividing the plurality of slots 202 into sequential frames 204. For example, if the channel interleave is six, then each sequential frame would have six slots 202. If, as shown in FIG. 3, the channel interleave is three, then each sequential frame 204 would have three slots 202. Further, the channel interleave in combination with the slot offset will define a specific slot for the subscriber device 30. For example, as shown in FIG. 3, when the subscriber device 30 is assigned to a channel defined by a slot having an slot offset of one and the channel interleave of the signal frame is three, the subscriber device 30 will receive the first of every three slots 202 in each sequential frame 204.

Figure 4:
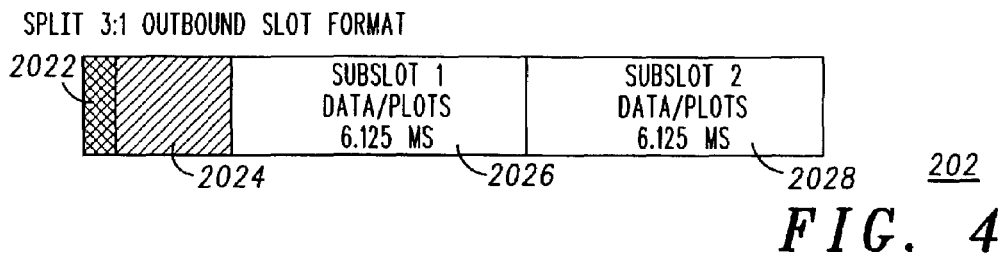
FIG. 4 illustrates an exemplary slot of the time division multiplexed signal frame of FIG. 3.

Referring to FIG. 4, each of the slots 202 contains a synchronization block 2022 for providing frame synchronization, a predetermined number of subslots (e.g., 2026, 2028) for containing a payload for a predetermined number of signals and a slot descriptor block 2024 for alternately containing overhead information for the plurality of subslots (e.g., 2026, 2028). For example, referring to FIGS. 4 and 7, an exemplary slot 202 includes first and second subslots 2026, 2028 and the slot descriptor block 2024 describes the first subslot 2026 when the slot number is an even number and describes the second subslot 2028 when the slot number is an odd number. The signal frame format in which each of the sequential frames 204 includes three slots 202 and each of the three slots 202 includes two subslots 2026, 2028 will be referred to as the Split 3:1 Outbound Slot Format.

It should be noted that a subslot or an entire slot may be empty and not contain payload. Also, a particular slot may not be composed of a plurality of subslots.

Figure 5:
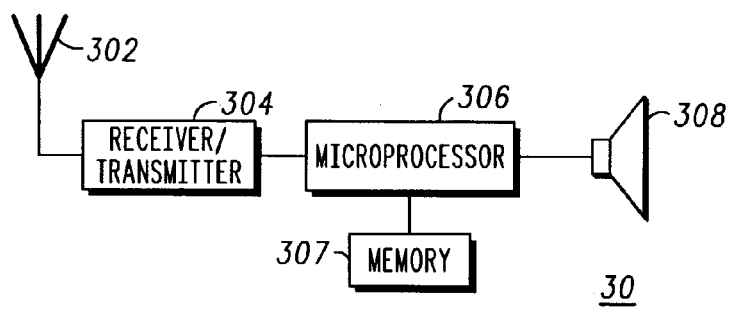
FIG. 5 illustrates a block diagram of the subscriber device within the iDEN system of FIG. 1.

The subscriber device 30 will be discussed with reference to FIG. 5. The subscriber device 30 is for providing a user (of the subscriber device) access to a subslot of the signal frame 20. Of course the subscriber device 30 is further for performing other functions that are generally known and/or not pertinent to this discussion. The subscriber device 30 includes a subscriber device antenna 302, a transceiver 304 for receiving the signal frames 20 and for sending voice or data signals and a speaker 308 for providing a user interface. The subscriber device 30 also includes a microprocessor or digital signal processing chip 306 for controlling the subscriber device 30 in accordance with routines stored in a memory 307.

During operation, the subscriber device 30 receives control channel information over a control channel when it originally establishes a connection with the base radio 104. This base radio 104 that the subscriber device 30 is currently connected to will be referred to as a current base radio 104 for clarity. The control channel information will include the current slot number and current subslot, will contain the traffic intended for the subscriber device 30, and may also optionally include an slot offset assignment and the channel interleave. The subscriber device 20 is subsequently placed on a traffic channel with the current base radio 104 and begins to receive the sequential frames 204 of the signal frame 20. The subscriber device 30, operating in accordance with the routines stored in the memory 307, demultiplexes each of the sequential frames 204 according to the channel interleave in order to receive a current slot of the plurality of slots 202. For example, if the slot offset assignment is three and the channel interleave is three, then the current slot would be every third slot of the sequential frames 204. After demultiplexing the sequential frames 204, the subscribe device 30 will decode the current subslot of the plurality of subslots included in the current slot by utilizing the slot descriptor block 2024. The particular subslot decoded will depend on the value of the slot number of the current slot. For example, as discussed above, if the current slot in which the current subslot is contained has an odd number, the slot descriptor block 2024 will be utilized for decoding the second subslot. Therefore, if the subscriber device 30 has been assigned to the first subslot, it will begin decoding upon receiving the first even numbered current slot. Also, if the subscriber device 30 has been assigned to the second subslot, it will begin decoding upon receiving the first odd numbered current slot. As those skilled in the art should appreciate, the subscriber device 30 is aware of the current slot number of each of the plurality of slots because a slot number was originally received with the control channel information from the current base radio and there is a common timing rate between the base radio 104 and the subscriber device 30.

After the first current subslot has been decoded, the subscriber device 30 will not have to utilize the slot descriptor block 2024 in each subsequent current slot for obtaining the payload information stored in the current subslot for as long as the subscriber device 30 remains connected to the current base radio 104. However, when the subscriber device 30 performs a handover between the current base radio 104 and a new base radio (not shown), the subscriber device 30 will have to once again utilize the slot describer block 2024 to verify that the new slot and new subslot it is on is correct. Further, because the slot descriptor block 2024 alternately describes a subslot in each slot 202, the handover must be done with a predetermined timing in order to avoid an extended mute (described more fully below). This process for determining the timing for jumping to the new slot and the new subslot will be referred to as the handover process 600.

Figure 6:
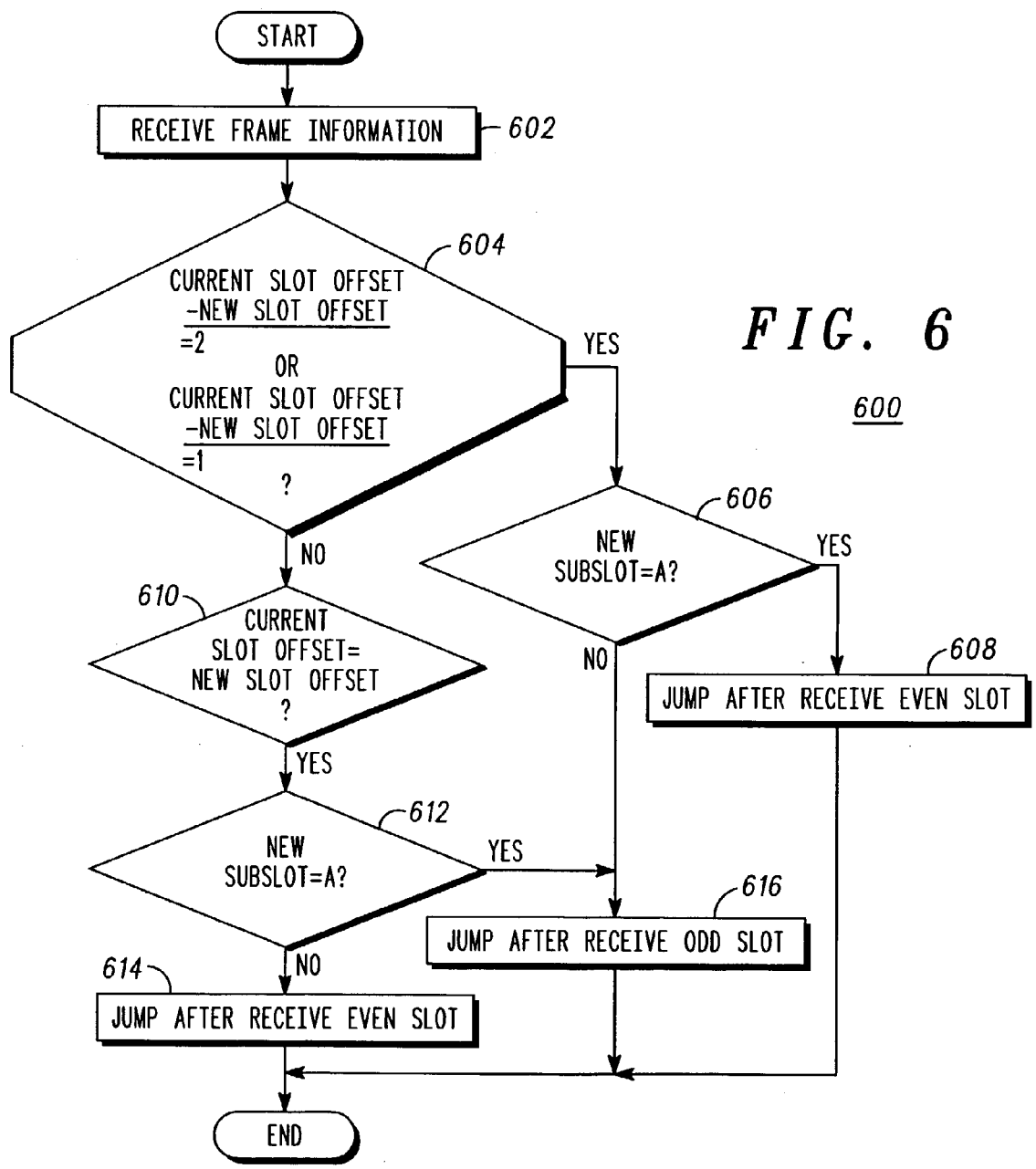
FIG. 6 illustrates a flow chart of the handover process executed by the subscriber device.

Referring to FIG. 6, the handover process 600 will be discussed with respect to a signal frame 20 having the Split 3:1 Outbound Slot Format shown in FIGS. 3-4. The handover process 600 is for determining a timing for jumping to the new slot and the new subslot based upon the current slot 202, the new slot and the new subslot. The handover process 600 begins at 602 when the subscriber device 30 receives a slot assignment (or frame information) for a new base radio from the current base radio. The slot assignment will include a new slot (indexed by the slot offset) of the three slots 202 in the sequential frame 204 as well as a new subslot of the plurality of subslots 2026, 2028.

At 604, the subscriber device 30 determines a difference between the slot offset of the current slot and the slot offset of the new slot. If the absolute value of this difference is equal to two or one, then at 606 the subscriber device 30 determines if the new subslot is the first subslot 2026 (shown as A) or the second subslot 2028. If the new subslot is the first subslot 2026, then at 608 the subscriber device 30 determines that the proper timing for jumping to the signal frame of the new base radio is after receiving a slot with an even slot number (even slot) from the current base radio 104 and the process 600 subsequently ends.

If, at 606 the subscriber device determines that the new subslot is the second subslot 2028, then at 616 the subscriber device determines that the proper timing for jumping to the signal frame of the new base radio is after receiving a slot with an odd slot number (odd slot) from the current base radio 104 and the process 600 subsequently ends.

Returning to 604, if it is determined here that the absolute value of the difference between the slot offset of the current slot 202 and the slot offset of the new slot is not equal to two or one, at 610 it is determined if this difference is equal to zero. In other words, it is determined at 610 if the slot offset of the current slot is equal to the slot offset of the new slot. If this difference is equal to zero, it is determined at 612 if the new subslot is the first subslot 2026. If the new subslot is the first subslot 2026, at 616 the subscriber device 30 determines that the proper timing for jumping to the signal frame of the new base radio is after receiving an odd slot from the current base radio 104 and the process 600 subsequently ends.

If the new subslot is the second subslot 2028, at 614, the subscriber device 30 determines that the proper timing for jumping to the signal frame of the new base radio is after receiving an even slot from the current base radio 104 and the process 600 subsequently ends.

It should be noted that no second branch is shown for decision block 610 because a signal frame with a channel interleave of three, such as the Split 3:1 Outbound Slot Format, should never result in a difference between the slot offset of the new slot and of the current slot that is not two, one or zero. However, an error signal could optionally be generated here if the difference was determined to be a value other than two, one or zero.

Finally, after the timing has been determined, the subscriber device 30 will jump to the new slot and the new subslot in accordance with the determined timing.

Referring again to FIGS. 3-4, the Split 3:1 Outbound Slot Format will be described more fully. As mentioned above, the signal frame 20 has a channel interleave of three, which thereby separates the plurality of slots 202 into sequential frames 204 that each include three slots 202. Each of the three slots 202 includes a synchronization block 2022 with a time duration of approximately 0.75 ms, a slot descriptor block 2024 with a time duration of approximately 2 ms, and first and second subslots 2026, 2028 that each have a time duration of approximately 6.125 ms. Each of the slots 202 will have a time duration of approximately 15 ms. As in conventional time division multiplexed signal frames, each slot 202 has a specific slot number (shown in FIG. 7). The slot descriptor block 2022 of a slot 202 contains overhead information for the first subslot 2026 when the slot number of the slot 202 is an even number and contains overhead information for the second subslot 2028 when the slot number is an odd number. The Split 3:1 Outbound Slot Format permits use of enhanced transcoders such as, for example, the AMBE transcoder. Accordingly, the iDEN system can double the channel efficiency and realize RF capacity savings. Further, because the slot descriptor block 2022 is shared by the subslots, use of the enhanced transcoder does not provide lower audio quality or higher audio delay.

Referring to FIG. 7, exemplary operation of the base radio 104 and subscriber device 30 in accordance with the above methodology will be discussed. The signal frame 20 generated by the base radio 104 has the Split 3:1 Outbound Slot Format. Payload intended for the subscriber device 30 has been stored in the first subslot of the first slot (depicted by 702) in every sequential frame 204. A subscriber device 30 demultiplexes each sequential frame 204 to receive the first slot of the sequential frame 204 having an even slot number such as, for example, slot number four. As discussed earlier, the subscriber device 30 knows to receive the first slot of each sequential frame 204 because it receives the slot offset (in this case one) and the first slot number from the base radio 104 with the control channel information.

The subscriber device 30 subsequently utilizes the slot descriptor block 2024 to decode the first subslot 702. Afterwards, the subscriber device 30 will continue to receive the first subslot 702 of every sequential frame without having to utilize the slot descriptor block 2024 until a handover is performed.

Before the subscriber device 30 performs the handover, it will receive the new slot assignment on the signal frame 20 generated by the current base radio 10. This slot assignment indicates the location of channel interleave on the signal frame 21 generated by the new base radio. In this example, the new slot assignment for the subscriber device 30 is the second subslot of the third slot (depicted by 704) of every sequential frame 204. The subscriber device 30 subsequently determines an absolute value of the difference between the slot offset of the current slot (one) and the slot offset of the new slot (three). In this example, the absolute value of the difference is equal to two. The subscriber device 30 then determines if the new subslot is the first subslot or the second subslot. In this example, the new subslot is the second subslot. Therefore, the subscriber device 30 determines that the timing for a jump should be immediately after receiving a first slot of the sequential frame 204 having an odd slot number from the current base radio. In accordance with this determined timing, the subscriber device 30 jumps after, for example, receiving the slot having a slot number of seven from signal frame 20 of the current base radio 104 to the signal frame 21 generated by the new base radio and properly receives the third slot of a sequential frame 204 having an odd slot number. This is depicted by the second arrow in FIG. 7.

If the subscriber device 30 does not execute the handover process 600 for determining the proper timing for jumping, the user of the subscriber device 30 could incur an additional 45 ms of mute time. For example, if the subscriber device 30 in the above example had jumped to the new signal frame 21 after receiving the slot having a slot number of four from the current base radio 10, the subscriber device 30 would have received the slot having a slot number of six on the new signal frame 21. This is depicted by the first arrow in FIG. 7. However, because the slot descriptor block describes the first subslot in slots having an even slot number, the subscriber device 30 will not be able to decode the second subslot of slot number six because it cannot confirm that the slot type is correct. As a result, the subscriber device 30 would have to wait for slot nine in the next sequential frame 204. As discussed above, each slot has a time duration of approximately 15 ms. Therefore, the user of the subscriber device would incur a mute of 45 ms because three slots are in the sequential frame 204.

Referring to FIG. 8, a table 800 summarizes all of the timings for jumping from and to a Split 3:1 Outbound Slot Format signal frame. This table 800 could be stored in the subscriber device memory. Accordingly, the subscriber device 30 could refer to the timings in the table 800 for determining the timing for the jump rather than determining a difference.

Therefore, the present invention provides a novel methodology in which the base radio 104 generates signal frames 20 having a specific channel interleave. The signal frames 20 are received by the subscriber device 30. Each signal frame 20 includes a number of sequential frames 204 that each include a number of slots equal to the channel interleave. Each of the number of slots 202 includes a plurality of subslots (e.g., 2026, 2028) and a slot descriptor block 2024 that is shared by the plurality of subslots (e.g., 2026, 2028). The subscriber device 30 executes a handover process 600 for jumping to a signal frame 21 generated by a new base radio. A microprocessor 106 controls the base radio 104 to generate these signal frames in accordance with routines stored in a memory 107. A microprocessor 306 controls the subscriber device 30 to receive the signal frame and execute the handover process 600 in accordance with routines stored in a memory 307.

While the above description is of the preferred embodiment, it should be appreciated that this embodiment may be modified, altered, or varied without deviating from the scope and fair meaning of the following claims. For example, with respect to the Split 3:1 Outbound Slot Format, the slot descriptor block 2024 could be modified to describe the first subslot 2026 in slots having an odd slot number.

Also, the base radio 104 may generate a signal frame that has a mixture of slots that include subslots and slots that do not include subslots. Further, the number of subslots in each slot is not limited to two and may be increased. However, the number of subslots in each of the slots must be in accordance with a bandwidth requirement of the plurality of transcoders.

The invention claimed is:

1. A base radio for generating a time division multiplexed signal comprised of a plurality of sequential frames, wherein each of the plurality of sequential frames comprises:
   a plurality of slots comprising a channel interleave of three slots, and each of the three slots having a specific slot offset associated therewith, at least one of the plurality of slots comprising a fist subslot and a second subslot, the at least one of the plurality of slots comprising:
      a plurality of subslots for containing a payload for a plurality of users; and
      a slot descriptor block for alternately containing overhead information for the first subslot and the second subslot based upon the specific slot offset.

2. The base radio of claim 1, wherein:
   each of the first subslot and the second subslot has a time duration of approximately 6.125 ms; and
   the slot descriptor block has a time duration of approximately 2 ms.

3. The base radio of claim 1, wherein the slot descriptor block contains the overhead information for the first subslot when a slot number associated with the first subslot and the second subslot is an even number and contains the overhead information for the second subslot when the slot number is an odd number.

4. The base radio of claim 1, wherein each of the plurality of slots has a time duration of approximately 15 ms.

5. A method for multiplexing a plurality of signals onto a common carrier, the method comprising:
   separating the plurality of signals into at least three slots in accordance with a channel interleave of at least three, each of the slots including a predetermined number of the plurality of signals wherein at least one of the three slots including a first signal and a second signal;
   generating a slot descriptor block for storing in each slot, the slot descriptor block for alternately containing overhead information for the predetermined number of the plurality of signals;
   storing the slot descriptor block containing overhead information for one of the first signal or the second signal in the each slot based upon a slot number of the channel interleave; and
   assigning a specific slot offset to each of the predetermined number of slots.

6. The method of claim 5, wherein the generating of the slot descriptor block for storing in each slot further comprises storing the slot descriptor block containing overhead information for the first signal when the slot number of the each slot is an even number and storing the slot descriptor block containing overhead information for the second signal when the slot number of the each slot is an odd number.

7. The method of claim 5, wherein the separating of the plurality of signals into the predetermined number of slots further comprises separating the plurality of signals so that each of the predetermined number of slots has a time duration of approximately 15 ms.

8. The method of claim 7, wherein the generating of the slot descriptor block for storing in each slot further comprises generating the slot descriptor block of each of the predetermined number of slot to have a time duration of 2 ms.

* * * * *